(12) United States Patent
Parsons et al.

(10) Patent No.: US 12,710,596 B2
(45) Date of Patent: Aug. 18, 2026

(54) PROCESS VARIATION-TOLERANT CASCADED TAPERED OPTICAL RING RESONATORS

(71) Applicant: XILINX, INC., San Jose, CA (US)

(72) Inventors: Robert Parsons, New York, NY (US); Chuan Xie, Fremont, CA (US); Mayank Raj, San Jose, CA (US)

(73) Assignee: XILINX, INC., San Jose, CA (US)

( * ) Notice: Subject to any disclaimer, the term of this patent is extended or adjusted under 35 U.S.C. 154(b) by 254 days.

(21) Appl. No.: 18/515,037

(22) Filed: Nov. 20, 2023

(65) Prior Publication Data

US 2025/0164696 A1 May 22, 2025

(51) Int. Cl.
*G02B 6/293* (2006.01)

(52) U.S. Cl.
CPC ....... *G02B 6/29343* (2013.01); *G02B 6/2938* (2013.01)

(58) Field of Classification Search
CPC .............. G02B 6/29343; G02B 6/2938; G02B 6/12007
See application file for complete search history.

(56) References Cited

U.S. PATENT DOCUMENTS

| | | | |
|---|---|---|---|
| 11,125,946 B2 * | 9/2021 | Le Maitre ............ | G02F 1/3132 |
| 2015/0016767 A1 | 1/2015 | Akiyama | |
| 2020/0249472 A1 * | 8/2020 | Tait ........................ | G02F 1/225 |
| 2023/0161106 A1 | 5/2023 | Bhargava et al. | |
| 2023/0333441 A1 | 10/2023 | Luan et al. | |

FOREIGN PATENT DOCUMENTS

| | | |
|---|---|---|
| CN | 116449499 A | 7/2023 |

OTHER PUBLICATIONS

International Search Report and Written Opinion from PCT/US2024/054748 dated Feb. 19, 2025.
M. Raj et al., "A O.96pJ/b 7 x 50Gb/s-per-Fiber WDM Receiver with Stacked 7nm CMOS and 45nm Silicon Photonic Dies," 2023 IEEE International Solid- State Circuits Conference (ISSCC), pp. 11-13.
R. Parsons, et al., "Efficient Silicon Photonic Add-Drop Microdisk Filters for DWDM Systems," in CLEO 2023, Technical Digest Series (Optica Publishing Group, 2023), paper JW2A. 127.
Aleksandr Biberman, et al., "Adiabatic microring modulators," Opt. Express 20, 29223-29236 (2012).

* cited by examiner

*Primary Examiner* — John Bedtelyon
(74) *Attorney, Agent, or Firm* — Patterson + Sheridan, LLP

(57) ABSTRACT

Embodiments herein describe a method for selectively filtering different wavelengths of optical signals received from an optical channel using cascaded ring resonators, each of the cascaded ring resonators having a first ring and a second ring. The first ring has a varying waveguide width along its length configured to form a first waveguide width portion and a second waveguide width portion, the first waveguide width portion having a greater width than the second waveguide width portion. The second ring has a varying waveguide width along its length configured to form a third waveguide width portion and a fourth waveguide width portion, the fourth waveguide width portion having a greater width than the third waveguide width portion. The method further connects receivers to respective cascaded ring resonators, each of the receivers having a photodetector configured to differentiate between the optical signals.

20 Claims, 3 Drawing Sheets

Selectively filter different wavelengths of optical signals received from an optical channel using cascaded ring resonators, each of the cascaded ring resonators including:

a first ring having a varying waveguide width along its length configured to form a first waveguide width portion and a second waveguide width portion, the first waveguide width portion being greater than the second waveguide width portion; and a second ring having a varying waveguide width along its length configured to form a third waveguide width portion and a fourth waveguide width portion, the fourth waveguide width portion being greater than the third waveguide width portion

320

Connect receivers to respective cascaded ring resonators, each of the receivers having a photodetector configured to differentiate between the optical signals

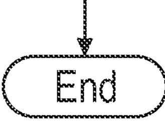

FIG. 3

PROCESS VARIATION-TOLERANT CASCADED TAPERED OPTICAL RING RESONATORS

TECHNICAL FIELD

Examples of the present disclosure generally relate to a cascaded ring resonator having rings with tapered ends forming a tapered coupling region.

BACKGROUND

The growing demand of bandwidth in modern high-speed communication in conjunction with the slowing down of Moore's Law, demands new technology and innovative techniques in circuit design to meet current challenges in datacenters, supercomputers and other applications. Integrated high-speed silicon-photonics devices such as ring modulators and cascaded ring resonators have the characteristics to meet this high bandwidth demand due to their energy efficiency, and ability to be used in wavelength division multiplexing (WDM) systems. However, such integrated high-speed silicon-photonics devices may be sensitive to process variations, potentially causing poor performance. For example, process variations can result from a mismatch between rings of the cascaded ring resonators. For at least such reason, improved techniques for maximizing output modulation amplitude in optoelectronic devices are desired.

SUMMARY

One embodiment described herein is a cascaded ring resonator including a first ring having a varying waveguide width along its length configured to form a first waveguide width portion and a second waveguide width portion, the first waveguide width portion having a greater width than the second waveguide width portion and a second ring having a varying waveguide width along its length configured to form a third waveguide width portion and a fourth waveguide width portion, the fourth waveguide width portion having a greater width than the third waveguide width portion.

One embodiment described herein is a wavelength division multiplexing (WMD) optical system for cascaded ring resonators configured to selectively filter different wavelengths of optical signals received from an optical channel, each of the cascaded ring resonators including a first ring having a varying waveguide width along its length configured to form a first waveguide width portion and a second waveguide width portion, the first waveguide width portion having a greater width than the second waveguide width portion and a second ring having a varying waveguide width along its length configured to form a third waveguide width portion and a fourth waveguide width portion, the fourth waveguide width portion having a greater width than the third waveguide width portion. Each of the cascaded ring resonators further includes receivers configured to be connected to respective cascaded ring resonators, each of the receivers having a photodetector configured to differentiate between the optical signals.

One embodiment described herein is a method for selectively filtering different wavelengths of optical signals received from an optical channel using cascaded ring resonators, each of the cascaded ring resonators including a first ring having a varying waveguide width along its length configured to form a first waveguide width portion and a second waveguide width portion, the first waveguide width portion having a greater width than the second waveguide width portion and a second ring having a varying waveguide width along its length configured to form a third waveguide width portion and a fourth waveguide width portion, the fourth waveguide width portion having a greater width than the third waveguide width portion. The method further includes connecting receivers to respective cascaded ring resonators, each of the receivers having a photodetector configured to differentiate between the optical signals.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 3 illustrates a method for implementing cascaded ring resonators having varying wavelength widths.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
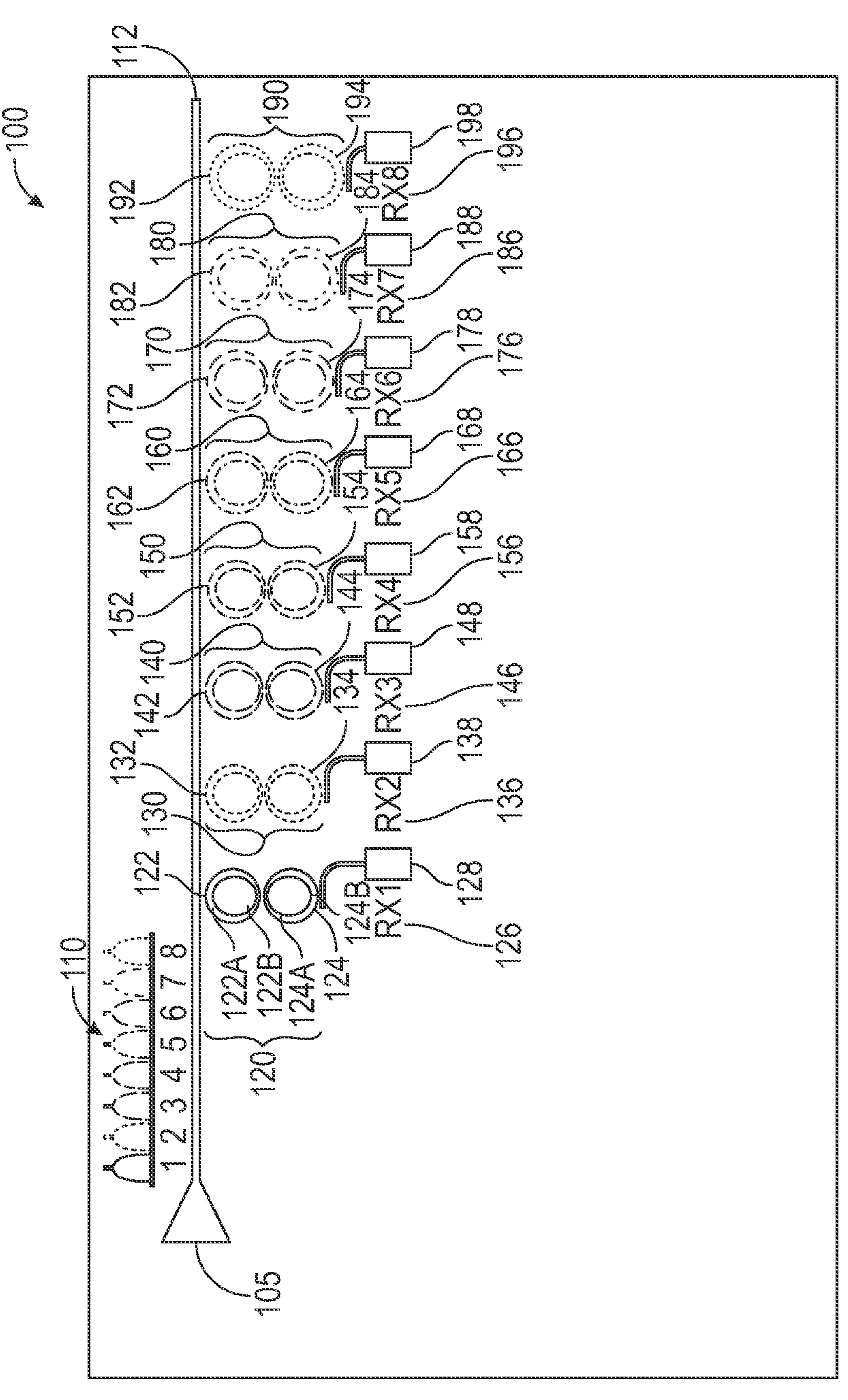
FIG. 1 illustrates a wavelength division multiplexing (WMD) system using cascaded ring resonators having varying wavelength widths, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe cascaded ring resonators having rings with varying wavelength widths. The cascaded ring resonators can be used in wavelength division multiplexing (WDM) systems as wavelength-selective filters for demultiplexing wavelengths corresponding to different channels. The cascaded ring resonators having rings with varying wavelength widths advantageously minimize or mitigate mismatch between rings, which, in turn, minimizes or mitigates an insertion loss.

Fiber optic communication technologies have evolved at a rapid pace in order to support current data driven societies. Many of the advancements have been in the area of finding ways to increase the transmission capacity of existing fiber network infrastructure. Since optical multiplexing is a useful technique to accomplish this, researchers have explored optimizing optical multiplexing related to at least wavelength, referred to as WDM.

WDM creates virtual fiber pathways over a single fiber strand by combining two or more wavelengths (i.e. colors) of laser light into optical signals transmitted over a single fiber. This is achieved by dividing the original bandwidth available into a series of non-overlapping wavelengths or frequencies, each carrying a separate signal. Through the application of optical (WDM) filters, different wavelengths are joined together (multiplexed) into a single optical transmission signal, only to be split apart again (demultiplexed) at the receiving end. This technique reduces the need for dedicated and wavelength specific optical links and multiplies the data-carrying capacity of existing fiber by a factor of the number of wavelengths (channels) combined.

WDM techniques include Coarse WDM (CWDM) and Dense WDM (DWDM).

Coarse WDM (CWDM) technology is capable to further increase the transmission capacity over a single fiber by providing up to 18 (most commercially available applications use 16) channels, across multiple wavelength bands. For transmission equipment to accurately interpret an optical signal, it is important the signal possesses a tall, well-defined peak for each channel, allowing individual signal peaks to become easily identifiable.

Dense WDM (DWDM) uses much narrower pass-band widths (+/−0.25 nm), allowing for much denser channel spacing (+/−0.8 nm) and as a result 16 DWDM channels will fit within the passband of one single CWDM channel. This allows for a lot more channels of optical communication and a lot higher transmission capacity.

It is contemplated that the exemplary cascaded ring resonators can be used in both CWDM and DWDM.

A cascaded ring resonator further acts as a filter. A filter is a circuit that can modify the frequency content of a signal. The filter allows certain frequencies to pass through it while attenuating others. In signal filtering, a signal's frequency content is used to extract useful information from it. A signal's frequency content refers to the different frequencies that make up the signal. A filter works by selectively passing or stopping certain frequency components of a signal. This is accomplished by designing the filter's frequency response, which specifies how the filter responds to different frequencies.

Filters are classified based on their order, which refers to the number of energy storage elements in the filter circuit. First order filters have one energy storage element in their circuit, while second order filters have two energy storage elements in their circuit. This means that second order filters have a steeper roll-off and a sharper transition between the passband and stopband than first order filters. Second order filters can be used to implement high-pass, low-pass, and band-pass filters. Second order filters extract useful information from signals and remove unwanted noise and interference.

Second order filters comprise several components that collectively generate the desired frequency response. These components include resistors, capacitors, inductors, and operational amplifiers. In second order filters, capacitors are used to generate low-pass, band-pass, and band-stop filters. The value of the capacitor can be adjusted to change the cutoff frequency of the filter. In second order filters, inductors are used to create band-pass and band-stop filters. The value of the inductor can be adjusted to change the cutoff frequency of the filter.

A consideration when designing second order filters is the quality factor, referred to as Q-factor. The Q-factor determines the shape of the frequency response curve and can be adjusted by varying the values of the components of the filter. A high Q-factor results in a narrow bandwidth and a steep roll-off, while a low Q-factor results in a wider bandwidth and a more gradual roll-off.

As noted above, second order filters are designed to attenuate unwanted frequencies while allowing desired frequencies to pass through. Second order filters can be classified into low-pass, high-pass, band-pass, and band-stop filters. Each type has its own unique frequency response.

A low-pass filter is a filter that passes signals with a frequency lower than a selected cutoff frequency and attenuates signals with frequencies higher than the cutoff frequency. A high-pass filter is a filter that passes signals with a frequency higher than a certain cutoff frequency and attenuates signals with frequencies lower than the cutoff frequency. A band-pass filter allows through components in a specified band of frequencies, called its passband, but blocks components with frequencies above or below this band. A passband is the range of frequencies or wavelengths that can pass through a filter. A stopband is a band of frequencies, between specified limits, through which a circuit, such as a filter, does not allow signals to pass, or the attenuation is above the stopband attenuation level. A stopband filter, also known as a notch filter, is a filter that attenuates a certain frequency band while allowing frequencies outside of it to pass through.

An ideal band-pass filter would have a completely flat passband, that is, all frequencies within the passband would be passed to the output without amplification or attenuation, and would completely attenuate all frequencies outside the passband. In practice, however, no band-pass filter is ideal. The filter does not attenuate all frequencies outside the desired frequency range completely. In particular, there is a region just outside the intended passband where frequencies are attenuated, but not rejected. This is known as the filter roll-off, and it is usually expressed in dB of attenuation per octave or decade of frequency. The steepness of the gain in the stop-band is the filter's roll-off. In other words, the roll-off is the steepness or slope in the transition region between the passband and the stopband.

Generally, the design of a filter seeks to make the roll-off as narrow as possible, thus allowing the filter to perform as close as possible to its intended design. Often, this is achieved at the expense of passband or stopband ripple. In other words, spectral flatness is a way to quantify the deviation of a passband from being perfectly flat across the frequency spectrum. The behavior of signals measured in the passband is not ideal and the deviation should be quantified relative to the ideal case.

Cascaded ring resonators include two rings coupled together to produce a second order filter with a flatter passband and a steeper roll-off. However, cascaded ring resonators are susceptible to process variations, especially mismatch between the rings, which increases an insertion loss of the device and lowers the yield of the system. The insertion loss is an amount of energy that a signal losses as it travels along a cable link. In the instance case, the insertion loss is the minimum attenuation in the filter's passband. A perfect filter would have no insertion loss at all, but all practical filters have some insertion loss. The exemplary cascaded ring resonators are designed to reduce the impact of process variations by altering a geometry of the waveguides of the rings of the cascaded ring resonators. As such, the altered geometry of the waveguides of the rings advantageously allows for the reduction of the insertion loss of the device and results in an increase in yield of the system.

FIG. 1 illustrates a wavelength division multiplexing (WMD) system using cascaded ring resonators having varying wavelength widths, according to an example.

The WMD optical system 100 receives data 105. The data 105 can be optical signals each having a different wavelength. In one example, eight optical signals 110 are shown each having a different light wavelength or color. The WMD optical system 100 can multiplex (combine or join) a number of optical signals onto a single optical fiber by using different wavelengths (i.e. colors) of laser light. The optical signals 110 are eventually received by a demultiplexer which separates the optical signals back to their original form.

In FIG. 1, the optical signals 110 are transmitted over a waveguide 112. The waveguide 112 can be, e.g., a linear waveguide. The waveguide 112 is coupled to a plurality of cascaded ring resonators. Each cascaded ring resonator includes two rings coupled to each other. In one example, there are eight cascaded ring resonators since there are eight optical signals transmitted over the waveguide 112. One skilled in the art can contemplate transmission of any number of optical signals over a channel.

The first ring resonator 120 has a first ring 122 and a second ring 124. The second ring 124 is connected to a receiver 126 having a photodetector 128. In one example, the photodetector 128 can be a silicon germanium (SiGe) waveguide photodetector, although the embodiments herein are not limited to any particular type of waveguide material. The first ring 122 is coupled to the second ring 124. The coupling of the two rings 122, 124 creates a second order filter enabling a flatter passband and a stepper roll-off. In one embodiment, the first ring resonator 120 is designed to have an insertion loss of less than 1.5 dB and crosstalk of less than 15 dB. The second order filter provides for lower crosstalk between adjacent wavelengths compared to a first order filter because of a steeper roll-off. The flatter passband is also less susceptible to laser wavelength spacing variations, which allows for collective thermal tuning of the first ring resonator 120 to match the laser wavelengths.

The second ring resonator 130 has a first ring 132 and a second ring 134. The second ring 134 is connected to a receiver 136 having a photodetector 138. In one example, the photodetector 138 can be a silicon germanium (SiGe) waveguide photodetector. The first ring 132 is coupled to the second ring 134. The coupling of the two rings 132, 134 creates a second order filter enabling a flatter passband and a stepper roll-off. In one embodiment, the second ring resonator 130 is designed to have an insertion loss of less than 1.5 dB and crosstalk of less than 15 dB.

The third ring resonator 140 has a first ring 142 and a second ring 144. The second ring 144 is connected to a receiver 146 having a photodetector 148. In one example, the photodetector 148 can be a silicon germanium (SiGe) waveguide photodetector. The first ring 142 is coupled to the second ring 144. The coupling of the two rings 142, 144 creates a second order filter enabling a flatter passband and a stepper roll-off. In one embodiment, the third ring resonator 140 is designed to have an insertion loss of less than 1.5 dB and crosstalk of less than 15 dB.

The fourth ring resonator 150 has a first ring 152 and a second ring 154. The second ring 154 is connected to a receiver 156 having a photodetector 158. In one example, the photodetector 158 can be a silicon germanium (SiGe) waveguide photodetector. The first ring 152 is coupled to the second ring 154. The coupling of the two rings 152, 154 creates a second order filter enabling a flatter passband and a stepper roll-off. In one embodiment, the fourth ring resonator 150 is designed to have an insertion loss of less than 1.5 dB and crosstalk of less than 15 dB.

The fifth ring resonator 160 has a first ring 162 and a second ring 164. The second ring 164 is connected to a receiver 166 having a photodetector 168. In one example, the photodetector 168 can be a silicon germanium (SiGe) waveguide photodetector. The first ring 162 is coupled to the second ring 164. The coupling of the two rings 162, 164 creates a second order filter enabling a flatter passband and a stepper roll-off. In one embodiment, the fifth ring resonator 160 is designed to have an insertion loss of less than 1.5 dB and crosstalk of less than 15 dB.

The sixth ring resonator 170 has a first ring 172 and a second ring 174. The second ring 174 is connected to a receiver 176 having a photodetector 178. In one example, the photodetector 178 can be a silicon germanium (SiGe) waveguide photodetector. The first ring 172 is coupled to the second ring 174. The coupling of the two rings 172, 174 creates a second order filter enabling a flatter passband and a stepper roll-off. In one embodiment, the sixth ring resonator 170 is designed to have an insertion loss of less than 1.5 dB and crosstalk of less than 15 dB.

The seventh ring resonator 180 has a first ring 182 and a second ring 184. The second ring 184 is connected to a receiver 186 having a photodetector 188. In one example, the photodetector 178 can be a silicon germanium (SiGe) waveguide photodetector. The first ring 182 is coupled to the second ring 184. The coupling of the two rings 182, 184 creates a second order filter enabling a flatter passband and a stepper roll-off. In one embodiment, the seventh ring resonator 180 is designed to have an insertion loss of less than 1.5 dB and crosstalk of less than 15 dB.

The eighth ring resonator 190 has a first ring 192 and a second ring 194. The second ring 194 is connected to a receiver 196 having a photodetector 198. In one example, the photodetector 198 can be a silicon germanium (SiGe) waveguide photodetector. The first ring 192 is coupled to the second ring 194. The coupling of the two rings 192, 194 creates a second order filter enabling a flatter passband and a stepper roll-off. In one embodiment, the eighth ring resonator 190 is designed to have an insertion loss of less than 1.5 dB and crosstalk of less than 15 dB.

The cascaded ring resonators 120, 130, 140, 150, 160, 170, 180, 190 enable WDM channel selection. As such, the cascaded ring resonators 120, 130, 140, 150, 160, 170, 180, 190 can be referred to as filters, as they filter out certain wavelengths corresponding to channels in the WMD optical system 100. For optimal performance, each of the cascaded ring resonators 120, 130, 140, 150, 160, 170, 180, 190 has a passband that matches to its corresponding laser wavelength while maintaining appropriate grid spacing. In one example, the grid spacing can be less than 1.5 nm.

Moreover, as described in more detail below with reference to FIG. 2, each ring of the cascaded ring resonators 120, 130, 140, 150, 160, 170, 180, 190 has a varying wavelength width. Each ring includes a single waveguide. In one example, each waveguide can have a substantially elliptical shape. Each waveguide has a varying width such that one end has a greater width than the other. In other words, taking the first ring resonator 120 as an example, the first ring 122 has a varying waveguide width along its length configured to form a first waveguide width portion 122A and a second waveguide width portion 122B, the first waveguide width portion 122A being greater than the second waveguide width portion 122B. The second ring 124 has a varying waveguide width along its length configured to form a third waveguide width portion 124A and a fourth waveguide width portion 124B, the fourth waveguide width portion 124B being greater than the third waveguide width portion 124A. The larger width portions of the waveguides decrease sensitivity to process variations to minimize an insertion loss.

Figure 2:
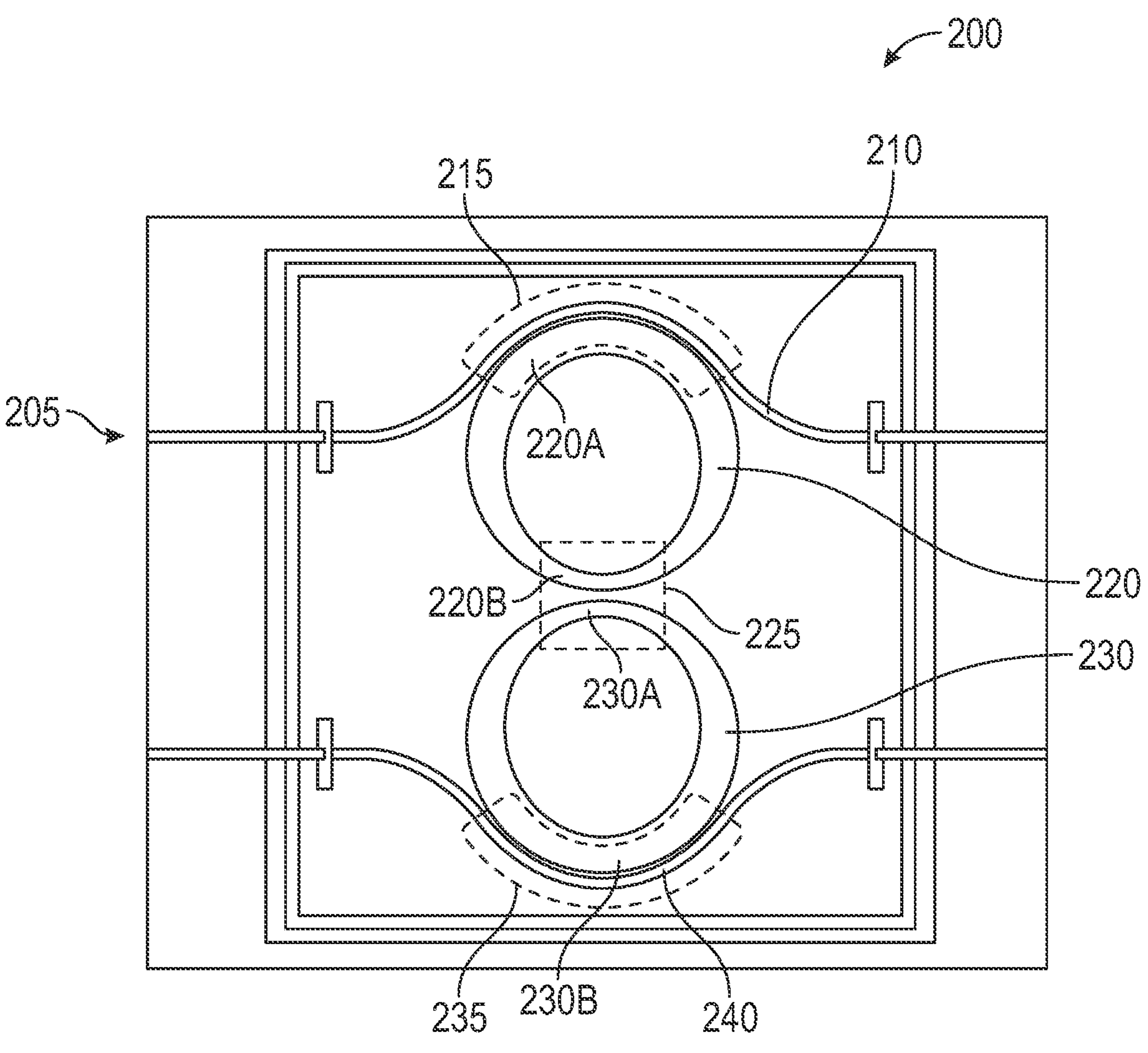
FIG. 2 is a perspective view of a cascaded ring resonator depicting the varying waveguide widths of each ring, according to an example.

FIG. 2 is a perspective view of a cascaded ring resonator depicting the varying waveguide widths of each ring, according to an example.

A cascaded ring resonator 200 is depicted having a first ring 220 and a second ring 230. The first ring 220 can be referred to as a top ring and the second ring 230 can be referred to as a bottom ring. The first ring 220 is coupled to a first linear waveguide 210 and the second ring 230 is coupled to a second linear waveguide 240. Signals are received at an input 205 of the first linear waveguide 210 and travel clockwise around the cascaded ring resonator 200. The first linear waveguide 210 can be referred to as a transmission port and the second linear waveguide 240 can be referred to as a drop port.

The first ring 220 and the first linear waveguide 210 form a first coupling region 215. The first ring 220 and the second ring 230 form a second coupling region 225. The second ring 230 and the second linear waveguide 240 form a third coupling region. The first coupling region 215 includes the wider waveguide portion 220A of the first ring 220. The second coupling region 225 includes the narrow waveguide portion 220B of the first ring 220 and the narrow waveguide portion 230A of the second ring 230. The third coupling region 235 includes the wider waveguide portion 230B of the second ring 230. As such, the geometry of the waveguides of the first ring 220 and the second ring 230 are changed or altered or modified to include wide portions and narrow portions, where the narrow portions form a central coupling region. Stated differently, the bottom half of the bottom ring and the top half of the top ring have a wider width which can support, e.g., a whispering gallery mode. The top half of the bottom ring and the bottom half of the top ring are narrow portions or tapered portions supporting only a single propagating mode.

The narrow waveguide portion 220B located in the second coupling region 225 can be referred to as a taper or elliptical taper. Similarly, the narrow waveguide portion 230A located in the second coupling region 225 can be referred to as a taper or elliptical taper. Collectively, the narrow waveguide portion 220B and the narrow waveguide portion 230A form the second coupling region 225 also referred to as a tapered coupling region. The second coupling region 225 (or tapered coupling region) supports a guided mode. The guided mode at the second coupling region 225 is less confined, which allows for higher coupling between the first ring 220 and the second ring 230. The second coupling region 225 only supports a single propagating mode. This means that higher order modes are suppressed by the second coupling region 225. As such, very little coupling occurs between a fundamental mode of one ring (e.g., the first ring 220) and higher order modes of the other ring (e.g., the second ring 230). This ensures that the intra-cavity loss of the device is small, and unwanted resonances from higher order modes are not supported.

In one example, the narrow width of the waveguides (e.g., 220B, 230A) of the rings can be about 300 nm-500 nm, whereas the wide width of the waveguides (e.g., 220A, 230B) of the rings can be about 1 um-1.5 um. The width gradually or incrementally or progressively increases from the narrow width region to the wide width region. The maximum width of the waveguide of the top ring is located adjacent the first linear waveguide 210. The maximum width of the waveguide of the bottom ring is located adjacent the second linear waveguide 240. The narrow widths are adjacent to each other in a central region.

A ring resonator is a useful device that acts as a high-Q filter for applications that use wavelength selectivity (e.g., WDM). This type of device has many resonances, and only these resonant wavelengths are coupled to the output waveguide. All systems, including molecular systems and particles, tend to vibrate at a natural frequency depending upon their structure. This frequency is known as a resonant frequency or resonance frequency. When an oscillating force, an external vibration, is applied at a resonant frequency of a dynamic system, object, or particle, the outside vibration will cause the system to oscillate at a higher amplitude (with more force) than when the same force is applied at other, non-resonant frequencies. In the WMD optical system 100, by varying the widths of the waveguides of the rings of the ring resonators, unwanted resonances or resonant frequencies from higher order modes are suppressed to support a single propagating mode at the second coupling region 225. As such, mismatch between the rings is minimized, resulting in minimal or negligible insertion loss.

The cascaded ring resonator 200 with the second coupling region 225 allows for an increase in the yield of photonic integrated circuits (PICs), thus enabling economically viable production of PICs for optical transceivers. The physics behind the process variation tolerance of whispering gallery mode resonators means that this solution is foundry-agnostic. Further, the solution of using wider waveguide portions and creating a second coupling region 225 is implemented at the design stage and avoids the additional complexity post-fabrication of tuning the rings independently to align the resonances. As such, the second coupling region 225 of the cascaded ring resonators described herein reduces the impact of process variations on the performance of the cascaded ring resonators. A mismatch between the first and second rings of each of the cascaded ring resonators is advantageously minimized or mitigated such that the insertion loss is significantly reduced or negligible.

FIG. 3 illustrates a method for implementing cascaded ring resonators having varying wavelength widths.

At block 310, different wavelengths of optical signals received from an optical channel using cascaded ring resonators are selectively filtered, each of the cascaded ring resonators including a first ring having a varying waveguide width along its length configured to form a first waveguide width portion and a second waveguide width portion, the first waveguide width portion being greater than the second waveguide width portion and a second ring having a varying waveguide width along its length configured to form a third waveguide width portion and a fourth waveguide width portion, the fourth waveguide width portion being greater than the third waveguide width portion. As such, the geometry of the waveguides of the first ring and the second ring are changed or altered or modified to include wide portions and narrow portions, where the narrow portions form a coupling region. Stated differently, the bottom half of the bottom ring and the top half of the top ring have a wider width which can support, e.g., a whispering gallery mode. The top half of the bottom ring and the bottom half of the top ring are narrow portions or tapered portions supporting only a single propagating mode.

At block 320, receivers are connected to respective cascaded ring resonators, each of the receivers having a photodetector configured to differentiate between the optical signals. WDM increases the bandwidth by allowing different data streams at different frequencies to be sent simultaneously over a single fiber optic network. In this way, WDM maximizes the usefulness of fiber and helps optimize network components. The foundation of WDM lies in its ability to send different data types over fiber networks in the form of light. Using a fiber optic cable for a single wavelength is inefficient and wasteful. Instead, by allowing different light channels, each with a different or unique wavelength, to be sent simultaneously over an optical fiber network, allows for the creation of a single efficient virtual fiber network.

In conclusion, in the field of silicon photonics, optical ring resonators show potential as components for photonic integrated circuits. Due to the resonators' high refractive index contrast, extremely small circuits can be produced. In addition, two or more optical ring resonators can be combined to develop high-order optical filters with compact size, minimal losses, and easy integration into existing networks. The exemplary cascaded ring resonators reduce or minimize mismatch between the rings resulting in the reduction of the insertion loss. This is accomplished by changing the geometry of the waveguide of each ring of the cascaded ring resonator. The geometry of the waveguide has a varying width along its length. As such, each waveguide of each ring has a wide portion and a narrow portion. The narrow portions of the first and second rings form a central coupling region configured to allow only a single propagating mode and configured to suppress unwanted resonances of higher order modes.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A cascaded ring resonator comprising:

a first ring having a varying waveguide width along its length configured to form a first waveguide width portion and a second waveguide width portion, the first waveguide width portion having a greater width than the second waveguide width portion; and a second ring having a varying waveguide width along its length configured to form a third waveguide width portion and a fourth waveguide width portion, the fourth waveguide width portion having a greater width than the third waveguide width portion, wherein the second waveguide width portion of the first ring and the third waveguide width portion of the second ring are positioned to face one another to form a first coupling region in which both first and second rings have narrowed waveguide widths.

2. The cascaded ring resonator of claim 1, wherein the first waveguide width portion of the first ring is coupled to a first linear waveguide to form a second coupling region.

3. The cascaded ring resonator of claim 1, wherein the first coupling region comprises a tapered transition between wide and narrow portions of the first and second rings.

4. The cascaded ring resonator of claim 3, wherein the fourth waveguide width portion of the second ring is coupled to a second linear waveguide to form a third coupling region.

5. The cascaded ring resonator of claim 1, wherein the first coupling region supports a single propagating mode.

6. The cascaded ring resonator of claim 1, wherein the first coupling region suppresses higher order modes such that less coupling occurs between a fundamental frequency of the first ring and higher order modes of the second ring, or vice versa.

7. The cascaded ring resonator of claim 1, wherein the first waveguide width portion of the first ring and the fourth waveguide width portion of the second ring are each configured to support more than one optical mode outside the first coupling region.

8. The cascaded ring resonator of claim 1, wherein the second waveguide width portion of the first ring and the third waveguide width portion of the second ring are axially aligned along the first coupling region.

9. The cascaded ring resonator of claim 1, wherein the cascaded ring resonator is used in a wavelength division multiplexing (WMD) optical system for wavelength selection.

10. A wavelength division multiplexing (WMD) optical system comprising:

cascaded ring resonators configured to selectively filter different wavelengths of optical signals received from an optical channel, each of the cascaded ring resonators including:

a first ring having a varying waveguide width along its length configured to form a first waveguide width portion and a second waveguide width portion, the first waveguide width portion having a greater width than the second waveguide width portion; and a second ring having a varying waveguide width along its length configured to form a third waveguide width portion and a fourth waveguide width portion, the fourth waveguide width portion having a greater width than the third waveguide width portion;

wherein the second waveguide width portion of the first ring and the third waveguide width portion of the second ring are positioned to face one another to form a first coupling region in which both first and second rings have narrowed waveguide widths; and receivers configured to be connected to respective cascaded ring resonators, each of the receivers having a photodetector configured to differentiate between the optical signals.

11. The WMD optical system of claim 10, wherein the first waveguide width portion of the first ring is coupled to a first linear waveguide to form a second coupling region.

12. The WMD optical system of claim 10, wherein first coupling region comprises a tapered transition between wide and narrow portions of the first and second rings.

13. The WMD optical system of claim 12, wherein the fourth waveguide width portion of the second ring is coupled to a second linear waveguide to form a third coupling region.

14. The WMD optical system of claim 10, wherein the first coupling region supports a single propagating mode.

15. The WMD optical system of claim 10, wherein the first coupling region suppresses higher order modes such that less coupling occurs between a fundamental frequency of the first ring and higher order modes of the second ring, or vice versa.

16. The WMD optical system of claim 10, wherein the first waveguide width portion of the first ring and the fourth waveguide width portion of the second ring are each configured to support more than one optical mode outside the first coupling region.

17. The WMD optical system of claim 10, wherein the second waveguide width portion of the first ring and the third waveguide width portion of the second ring are axially aligned along the first coupling region.

18. A method comprising:

selectively filtering different wavelengths of optical signals received from an optical channel using cascaded ring resonators, each of the cascaded ring resonators including:

a first ring having a varying waveguide width along its length configured to form a first waveguide width portion and a second waveguide width portion, the first waveguide width portion having a greater width than the second waveguide width portion; and a second ring having a varying waveguide width along its length configured to form a third waveguide width portion and a fourth waveguide width portion, the fourth waveguide width portion having a greater width than the third waveguide width portion;

wherein the second waveguide width portion of the first ring and the third waveguide width portion of the second ring are positioned to face one another to form a first coupling region in which both first and second rings have narrowed waveguide widths; and connecting receivers to respective cascaded ring resonators, each of the receivers having a photodetector configured to differentiate between the optical signals.

19. The method of claim 18, wherein the first waveguide width portion of the first ring is coupled to a first linear waveguide to form a second coupling region.

20. The method of claim 18, wherein the first coupling region supports a single propagating mode; and wherein the first coupling region suppresses higher order modes such that less coupling occurs between a fundamental frequency of the first ring and higher order modes of the second ring, or vice versa.

* * * * *